United States Patent [19]
Olsson

[11] Patent Number: 5,457,288
[45] Date of Patent: Oct. 10, 1995

[54] DUAL PUSH-CABLE FOR PIPE INSPECTION

[76] Inventor: Mark S. Olsson, 4671 Robbins St., San Diego, Calif. 92122

[21] Appl. No.: 199,724

[22] Filed: Feb. 22, 1994

[51] Int. Cl.⁶ .................................................. H01B 7/08
[52] U.S. Cl. .................. 174/117 R; 174/36; 174/105 R; 174/131 R; 348/84
[58] Field of Search ........................ 174/117 R, 117 F, 174/131 R, 131 A, 105 R, 36; 348/84

[56] References Cited

U.S. PATENT DOCUMENTS

| Re. 33,160 | 2/1990 | Guthrie et al. | 73/40.5 |
|---|---|---|---|
| 2,376,101 | 5/1945 | Tyzzer | 174/36 |
| 2,666,093 | 1/1954 | Wildberg | 174/117 R |
| 3,219,752 | 11/1965 | Harris | 174/117 F |
| 4,246,604 | 1/1981 | Hundertmark et al. | 358/100 |
| 4,368,214 | 1/1983 | Gillette | 174/117 F |
| 4,399,322 | 8/1983 | Hafner, Jr. | 174/131 A |
| 4,471,711 | 9/1984 | Graham | 174/103 |
| 4,487,996 | 12/1984 | Rabinowitz et al. | 174/105 R |
| 4,642,417 | 2/1987 | Ruthrof et al. | 174/36 |
| 4,719,316 | 1/1988 | Hoffman et al. | 174/88 R |
| 5,150,442 | 9/1992 | Desmons | 174/103 |
| 5,243,876 | 9/1993 | Mang et al. | 74/502.5 |

Primary Examiner—Morris H. Nimmo
Attorney, Agent, or Firm—Baker, Maxham, Jester & Meador

[57] ABSTRACT

A dual push-cable for mechanically and electrically connecting a video camera head to a video circuit to permit the head to be pushed down the inside a pipe and negotiate turns in the pipe as the push cable is forced down the pipe while permitting the video circuit to power and receive video signals from the video camera head. The push-cable comprises an elongate resilient flexible push member, and elongate electrical and/or fiber optic signal transmitting cable, and a hinge joining the push member and the signal transmitting cable in a substantially parallel spaced apart side-by-side relationship. The push member may be a cylindrical rod formed of fiberglass impregnated with epoxy resin. The electrical signal transmitting cable may be armored tri-axial cable. A waterproof jacket of polyethylene, high density polyethylene, polypropylene or copolymer propylene may be extruded around both the rod and cable to form a flexible resilient hinge which extends along the push-cable between the fiberglass rod and the triaxial cable.

11 Claims, 2 Drawing Sheets 5,457,288

DUAL PUSH-CABLE FOR PIPE INSPECTION

BACKGROUND OF THE INVENTION

The present invention relates to electro-mechanical systems for inspecting the inside of pipes for defects and obstructions, and more particularly, to a push-cable for use in such a system that mechanically and electrically connects a video camera head to a push reel and video circuit.

There are many situations in which it is desirable to inspect the inside of a pipe which is already in place, either underground, in a building, or underwater. For example, pipes designed to carry high-pressure steam can be internally inspected to determine if there are any cracks in the welds. Sewer pipes or drain lines can similarly be internally inspected to determine whether or not there are any obstructions or degradations in couplings which prevent free flow of waste material. Frequently, pipes which are to be inspected have an internal diameter of six inches or less. It is sometimes necessary to inspect several hundred feet of pipe.

Over the years, video pipe inspection systems have been developed which typically include a camera which is forced down the interior of the pipe so that its internal walls can be inspected on a video display. Conventional video pipe inspection systems include a push-cable which provides an electro-mechanical connection between a rugged head enclosing the video camera and a rotatable push reel which is used to play out the cable and force the head down the pipe. Typically, the push-cable has a co-axial configuration. Both the relatively stiff mechanical portions of the cable and the electrical conductors thereof are arranged in a bundle having a substantially round cross-section. Problems arise because the cable must be sufficiently stiff in order that the head containing the video camera can be pushed hundreds of feet down the inside of a pipe. However, the cable must also be sufficiently flexible so that the video camera head can be forced through a number of tight turns which may include relatively sharp angles, such as ninety degrees. Also, because of the unitary construction of the push-cable typically used in conventional video pipe inspection systems, it is difficult to separate the mechanical and electrical connections in the video camera head in a reliable, efficient manner that will ensure against shorts and de-coupling during the substantial forces encountered during pushing and pulling.

SUMMARY OF THE INVENTION

It is therefore the primary object of the present invention to provide an improved push-cable for a video pipe inspection system.

According to the present invention a dual push-cable is provided for a video pipe inspection system of the type including a video camera head and a video circuit. The dual push-cable is specially adapted for mechanically and electrically connecting the video camera head to the video circuit to permit the head to negotiate turns in the pipe as the push-cable is forced down the pipe while permitting the video circuit to power and receive video signals from the video camera head. The push-cable comprises an elongate resilient flexible push member and an elongate signal transmitting cable. A hinge joins the push member and the signal transmitting cable in a substantially parallel, spaced apart, side-by-side relationship.

DETAILED DESCRIPTION OF THE PREFERRED EMBODIMENT

The term "signal transmitting cable", as used herein, shall include cables with metal conductors for transmitting electric signals, cables with fiber optic filaments for transmitting optical signals, as well as hybrids of the aforementioned two types of signal transmitting cables.

Figure 1:
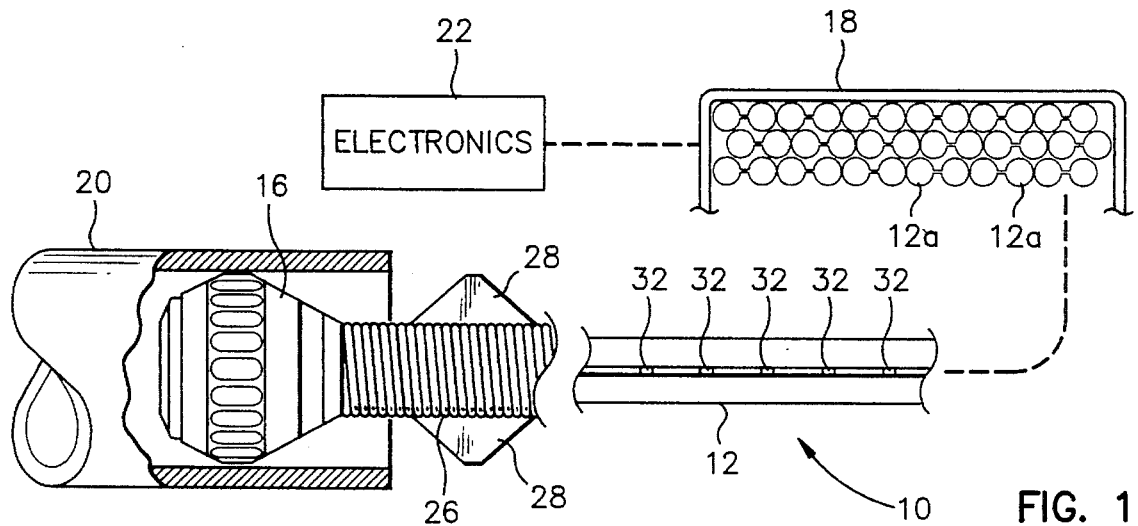
FIG. 1 is a diagrammatic view illustrating a video pipe inspection system equipped with a preferred embodiment of the dual push-cable of the present invention.

FIG. 1 illustrates in diagrammatic form a video pipe inspection system 10 which utilizes a preferred embodiment 12 of my dual push-cable. The forward, or distal, end of the push-cable 12 is coupled through a first connector 14 (FIG. 4) and other parts to a rugged head 16 (FIG. 1) which contains a small video camera. The push-cable 12 is wrapped into a plurality of circular coils 12a inside a push reel 18. Only a small cross-section of the outer portion of the push reel 18 is illustrated in FIG. 1. The push reel 18 is supported for manual rotation about a horizontal axis (not illustrated) so that the push-cable 12 can be played out to allow a user to manually push the cable 12 to force the video camera head 16 down the interior of a pipe 20 to be inspected. The push reel 18 can be rotated in the opposite direction to take up the push-cable 12 when the cable is manually pulled out of the pipe 20.

Figure 5:
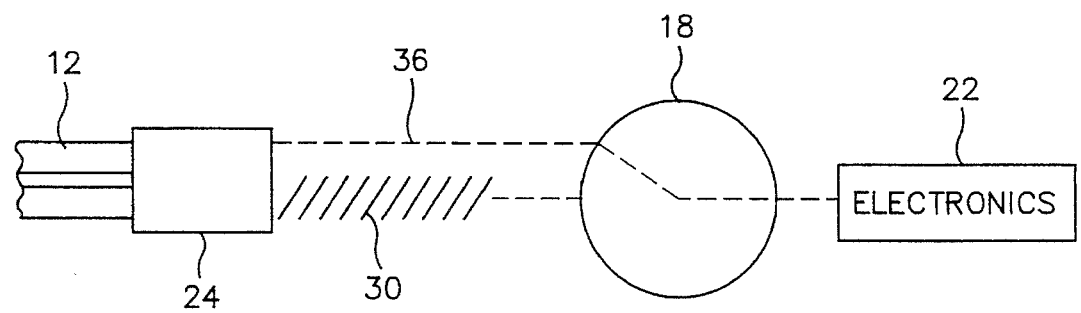
FIG. 5 is a diagrammatic view of a second connector coupling a rearward, or proximal, end of the preferred embodiment of the dual push-cable to a push reel hub.

The rearward, or proximal, end of the push-cable 12 is coupled to the push reel 18 and to a video circuit 22 by a second connector 24 (FIG. 5) which is similar in construction to the first connector 14. A coil spring 26 (FIG. 1) surrounds components of the system immediately aft of the video camera head 16 in order to provide the required flexibility for making turns. A plurality of circumferentially spaced, radially extending guides 28 are mounted around the first coil spring 26. These guides are sized to keep the portion of the system immediately aft of the video camera head 16 roughly centered within the internal walls of the pipe 20. A sewer cable 30 (FIG. 5) ties the rear end of the second connector 24 to the push reel 18 to provide an elastic coupling that prevents breakage of the push-cable 12. This could occur if the last coils 12a of the push-cable are played out too rapidly and the rear end of the push-cable were rigidly connected directly to the push reel 18.

Figure 2:
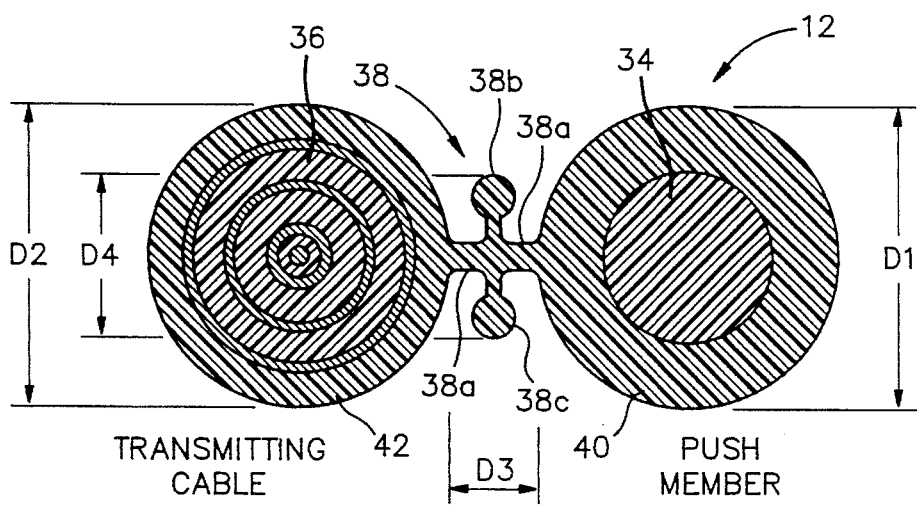
FIG. 2 is an enlarged cross-section of the preferred embodiment of the dual push-cable taken along line 2—2 of FIG. 3.
Figure 3:
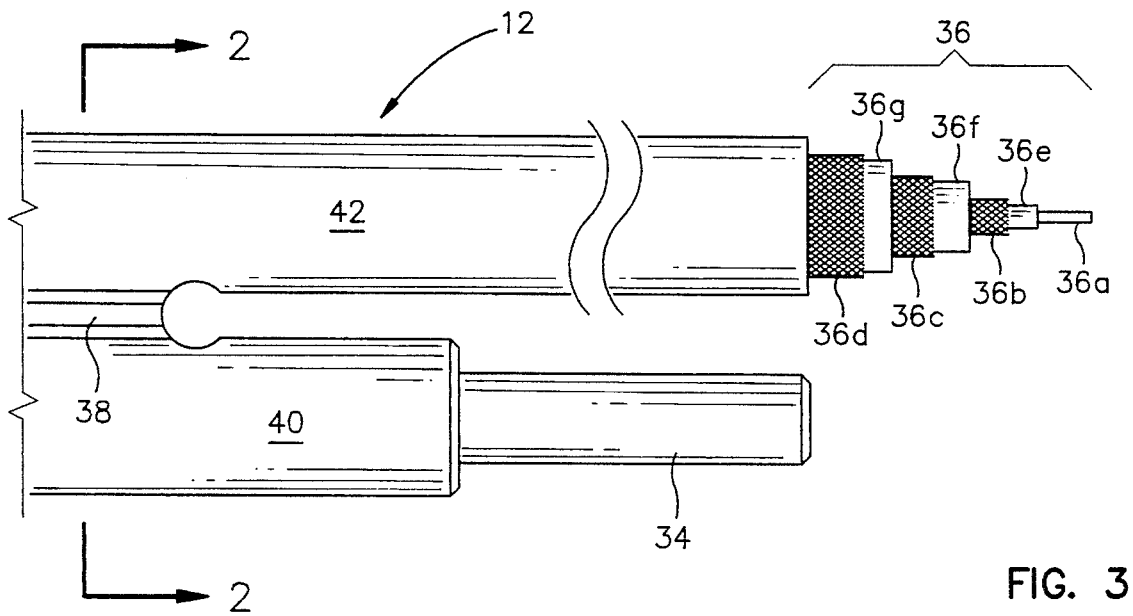
FIG. 3 is an enlarged fragmentary view of the preferred embodiment of the dual push-cable of the present invention illustrating further details of its construction.

FIG. 2 is an enlarged cross-section of the preferred embodiment of my dual push-cable taken along line 2—2 of FIG. 3. Referring to FIG. 2, the illustrated dual push-cable 12 comprises an elongate, resilient flexible push member 34, an elongate signal transmitting cable generally denoted 36, and an elongate resilient flexible hinge 38 joining the push member 34 and the signal transmitting cable 36 in a substantially parallel, spaced apart, side-by-side relationship. The push member 34 is preferably a cylindrical rod made of a composite plastic material such as fiberglass impregnated with epoxy, polyester or polyvinyl resin. The signal transmitting cable 36 is preferably a tri-axial cable having a central positive conductor 36a (FIG. 3), first and second braided conductors 36b and 36c concentrically surrounding the central positive conductor 36a, and a braided metal armor shield 36d concentrically surrounding the conductors 36a, 36b and 36c. Tri-axial cable of this general type is commercially available. A first plastic insulating layer 36e separates the central positive conductor 36a and the first braided conductor 36b. A second plastic insulating layer 36f separates the first braided conductor 36b and the second braided conductor 36c. The second braided conductor 36c and the braided metal armor shield 36d are made of tin/copper and stainless steel, respectively, and are separated by a third plastic insulating layer 36g.

Referring again to FIG. 2, a waterproof jacket made of a plastic material is preferably extruded around the push member 34 and signal transmitting signal 36. The jacket includes a first portion 40 which surrounds the push member 34 and a second portion 42 which surrounds the signal transmitting cable 36. The waterproof jacket includes a third portion which forms the connecting hinge 38. The outer diameter D1 of the first portion 40 of the waterproof jacket is substantially equal to the outer diameter D2 of the second portion 42 of the waterproof jacket so that the push-cable 12 forms a generally flat, symmetrical body which is more easily pushed down the interior of the pipe 20. The waterproof jacket may be made of polyethylene, high density polyethylene or polypropelyene. More preferably, the waterproof jacket is made of copolymer propylene commercially available from EXXON CORPORATION under Product Identification Code PD 7031.

By way of example, the outer diameter of the fiberglass rod which forms the push member 34 may be approximately 0.250 inches. The outer diameter of the triaxial cable 36 may be approximately 0.330 to 0.340 inches. The outer diameters D1 and D2 of the first and second waterproof jacket portions 40 and 42 may be approximately 0.440 inches plus or minus 0.030 inches. The preferred embodiment of my push-cable may be manufactured utilizing well known techniques for extruding the plastic waterproof jacket over continuously supplied lengths of fiberglass rod and triaxial cable. The typical order quantity will be five thousand feet or greater in increments of two thousand five hundred feet.

The hinge portion 38 of the waterproof jacket includes a flexible generally planar main portion 38a which extends transversely between the first and second portions 40 and 42 and connects the same. The hinge portion 38 further includes a pair of oppositely extending reinforcing portions 38b and 38c. These reinforcing portions extend substantially orthogonal to the planar main portion 38a, intermediate the width of the main portion to form an I-beam. The outer ends of the reinforcing portions 38b and 38c are rounded. By way of example, the width D3 of the planar main portion 38a of the hinge may be approximately 0.135 inches plus or minus 0.015 inches. By way of further example, the distance D4 between the outer rounded ends of the reinforcing portion 38b and 38c may be approximately 0.238 inches plus or minus 0.015 inches. The centers of the rounded ends of the reinforcing portions 38b and 38c may be approximately 0.175 inches apart plus or minus 0.015 inches. The thickness of the planar main portion 38a may be approximately 0.040 inches plus or minus 0.005 inches. The centers of the push member 34 and the signal transmitting cable 36 may be approximately 0.570 inches apart plus or minus 0.050 inches.

Figure 4:
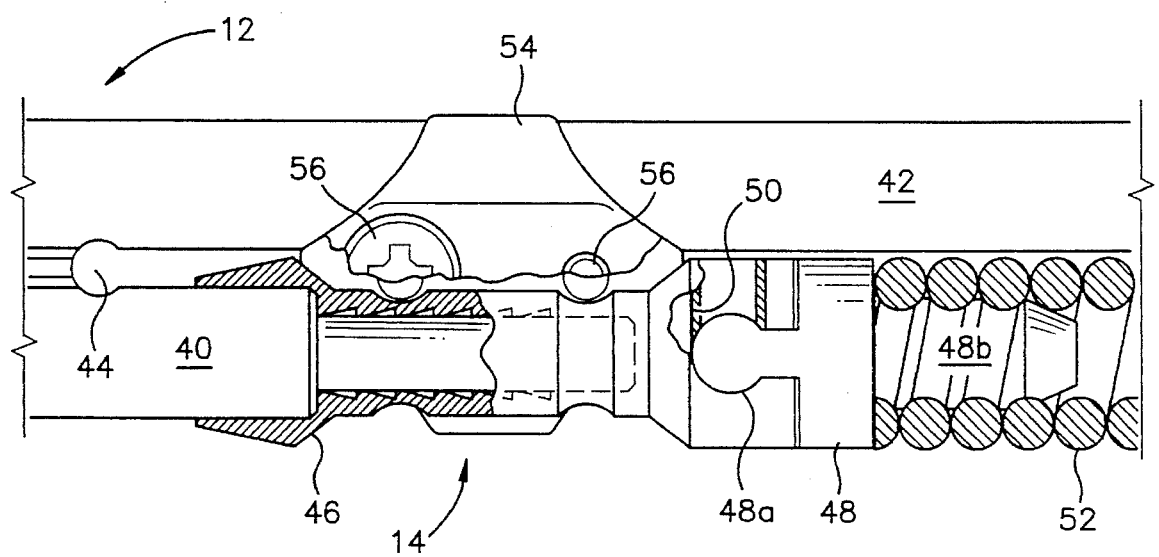
FIG. 4 is an enlarged side elevation view, with portions broken away of a first connector for coupling to a forward, or distal, end of the preferred embodiment of the dual push-cable.

FIG. 4 is an enlarged side elevation view of the first connector 14 which couples the forward or distal end of the push-cable 12 with the video camera head 16. The hinge portion 38 of the waterproof jacket is cut away to provide a gap 44 with a rounded radius to prevent the two halves of the push-cable from splitting apart. A short segment of the first portion 40 of the waterproof jacket is removed to reveal a short segment of the fiberglass rod 34. The exposed portion of the rod 34 and a short section of the first portion 40 of the waterproof jacket are inserted into a hollow hour-glass shaped metal sleeve 46. This sleeve has a cylindrical cross-section and barbed internal bores for receiving the fiberglass rod 34 and first portion 40 of the waterproof jacket. These parts are bonded to the sleeve 46 with a suitable waterproof adhesive such as epoxy resin.

A metal split pin male fitting 48 (FIG. 4), commercially available as GORLITZ (Trademark) part number E56, has a rounded projection 48a which is received inside a key slot 50 formed in the forward or distal end of the metal sleeve 46. The split pin male fitting 48 has a screw threaded shaft 48b which extends in an opposite direction from the rounded projection 48a. A GORLITZ (Trademark) sewer cable 52, Part Number C012, is screwed over the shaft 48b of the split pin male fitting 48. The other end of the cable 52 (not illustrated) is screwed over the shaft of a similar split pin male fitting in another metal fixture (not illustrated) which is secured to the rear end of the first coil 26 whose forward end is coupled to the video camera head 16. The forward or distal end of the trixal cable 36 (not visible in FIG. 4) is coupled through a connector (not shown), to a springy helical cable similar to a telephone cord in order to provide the required NTSC video signal, power and ground connections with the charge coupled device (CCD) within the video camera head 16. Referring still to FIG. 4, a pair of conformably-shaped metal clamps such as 54 are squeezed over opposite side of the metal sleeve 46 and second portion 42 of the waterproof jacket and secured thereto in clam shell fashion via bolts 56.

My dual push-cable provides improved termination reliability. The mechanical connections are made and kept separate from the signal connections. This results in cost, reliability and performance advantages over conventional push-cables where the mechanical and electrical components are in a single, combined concentric construction.

It is possible to push a video camera head connected to my dual push-cable through turns in pipe with relatively small radii. This is because of the flat, ribbon-like construction of my dual push-cable compared to conventional concentric push-cables. My dual push-cable flexes predominantly across one axis i.e. the vertical axis in FIG. 2. It will flex along this axis more readily than a larger diameter bundle cable. My push-cable can more effectively cut the corner when passing through a bend inside of the pipe. It does not have to bend as sharply as a conventional concentric cable with a similar maximum transverse dimension.

A major advantage of my dual push-cable is its rugged construction in which the stiff component, namely the push member, is kept separate from the more delicate signal transmitting cable. The flat ribbon construction of my dual push-cable is easier to grip and feed by hand. It also lends itself more favorably to powered feeding and retrieving devices. The solid core fiberglass push rod is highly resilient to crushing and can be gripped very tightly between pinching drive rollers without damage. The stiffness of my dual push-cable can be increased simply by running a larger diameter push rod through the same construction. This is very difficult, if not impossible, in a conventional concentric or monolithic push-cable without increasing the overall diameter thereof. So long as my dual push-cable is not crushed on edge (across the hinge portion 38), it is very resistant to damage if run over by automobile or truck.

My dual push-cable tends to lie flat in the bottom of the pipe 20. When turning a corner through a pipe bend, my dual push-cable 12 must rotate or twist. If the cable 12 has high torsional stiffness (resistance to twisting), greater resistance is encountered in attempting to pass through one of several bends. This is especially true if bends are both up and down and side-to-side. The hinge portion 38 of my dual push-cable 12 allows the much more flexible signal transmitting cable 36 to rotate around the much stiffer push member 34. Thus, the hinge portion 38 of my dual push-cable 12 is extremely important. A dual push-cable construction in which the two sides, i.e., push member and signal transmitting cable, cannot flex or bend with respect to each other will be significantly more stiff in twist than in my construction which utilizes a flexible or "living" hinge.

The I-beam formed by the reinforcing portions 38b and 38c in effect results in a double hinge. It limits the overall travel of the planar portion 38a of the hinge in a controlled fashion. The centers of the push member 34 and signal transmitting cable 36 can be further separated thereby allowing one to rotate farther around the other before "bottoming" against one another or the center I-beam portion of the hinge. The amount of rotation is deliberately limited to prevent the planar portion 38a of the hinge, which is the delicate part thereof, from coming into direct contact with the pipe walls when twisting around corners. This protects the hinge from damage.

Instead of using a continuous hinge portion 38, the hinge could be discontinuous. Holes 32 (FIG. 1) or other shapes of sections could be laser cut, punched or otherwise removed therefrom after the extrusion process. By providing holes along the length of the hinge portion, several advantages are achieved. First of all, tears, rips or cuts that start along the hinge portion will stop when they reach a cut away section. Second, even greater flexibility in twist is possible if more of the hinge is removed. A thicker, stronger hinge portion can be used while still retaining good flexibility if a significant fraction of the hinge is periodically cut away along the length of my dual push-cable at regular intervals. Third, a series of evenly spaced uniform holes along the hinge permits a toothed drive and/or meter wheel to engage my dual-push cable. Accurate distance metering is very important to determine the precise position of the vide camera head 16 within the pipe 20. Distance or other types of markers might be printed, inscribed, cut or otherwise attached to my dual push-cable.

The hinge 38 does not have to be made of the same material as that which encases the push member 34 and signal transmitting cable 36. A different type of plastic could be coextruded to allow performance optimization, i.e., more abrasion resistance around the push member and the signal transmitting cable and more flexibility in the hinge. As part of the manufacturing process, it my be desirable to set or preflex the hinge 38. As extruded, the hinge is fairly stiff. By forcibly bending it back and forth a few times to the extremes of its possible travel, the hinge takes a set, and becomes significantly more flexible. This can be achieved by running my dual push-cable through a series of forming rollers.

In the preferred embodiment of my dual push-cable, the push member 34 is preferably fiberglass impregnated with epoxy resin and is manufactured according to the conventional pultrusion process. This results in a push member of high bending stiffness but with the ability to bend sharply without breaking. It is also possible to utilize a pultruded fiberglass rod with an outer bias wrap for greater bending strength. Also, an inner, high modules (stiff) fiber may be used in the center of the rod. For example, a carbon fiber core can be used to increase bending stiffness. KEVLAR (Trademark) or SPECTRA (Trademark) fibers may be used instead of fiberglass. Polyester, polyvinyl or epoxy resin can be used to bind the various fibers depending upon the properties desired.

It is also possible to use a metal push member, such as a steel piano wire or stainless steel aircraft cable. However, the utilization of a composite fiberglass and metal push member may result in difficulties in bonding to an outer fiberglass sheath. It is further possible to embed electrical conductors and optical fibers within the push rod 34.

While I have described a preferred embodiment of my dual push-cable, and modifications thereof, still further modifications will be apparent to those skilled in the art. Therefore, the protection afforded my invention should only be limited in accordance with the scope of the following claims.

I claim:

1. A dual push-cable, comprising:
    an elongate resilient flexible push member including a cylindrical rod made of fiberglass impregnated with epoxy resin;
    an elongate signal transmitting cable; and
    an elongate hinge joining the push member and the signal transmitting cable in a substantially parallel side-by-side relationship.

2. A dual push-cable according to claim 1 and further comprising a waterproof jacket surrounding the push member and the signal transmitting cable.

3. A dual push-cable according to claim 1 and further comprising a waterproof jacket surrounding the push member and the signal transmitting cable and forming the hinge.

4. A dual push-cable according to claim 3 wherein the jacket is selected from a material from the group consisting of polyethylene, high density polyethylene, polypropylene and copolymer propylene.

5. A dual push-cable according to claim 2 wherein a first outer diameter of a first portion of the jacket surrounding the push member is substantially equal to a second outer diameter of a second portion of the jacket surrounding the signal transmitting cable.

6. A dual push-cable, comprising:
    an elongate resilient flexible push member made of a composite plastic material;
    an elongate signal transmitting cable; and
    an elongate waterproof extruded plastic jacket having a first portion surrounding the push member, a second portion surrounding the signal transmitting cable, and a flexible resilient hinge portion joining the push member and the cable in a substantially parallel, spaced apart side-by-side relationship.

7. In a video pipe inspection system including a video camera head and a video circuit, a dual push-cable for mechanically and electrically connecting the head to the circuit to permit the head to be pushed down the inside of a pipe and to negotiate turns in the pipe as the cable is forced down the pipe while permitting the video circuit to power and receive video signals from the video camera head, comprising:
    an elongate resilient flexible push member;
    an elongate signal transmitting cable; and
    a hinge joining the push member and the signal transmitting cable in a substantially parallel spaced apart side-by-side relationship.

8. A dual push-cable, comprising:

an elongate resilient flexible push member;

an elongate signal transmitting cable including a central positive conductor and at least one braided conductor concentrically surrounding the central positive conductor; and an elongate hinge joining the push member and the signal transmitting cable in a substantially parallel side-by-side relationship.

9. A dual push-cable, comprising:

an elongate resilient flexible push member;

an elongate signal transmitting cable; and an elongate hinge joining the push member and the signal transmitting cable in a substantially parallel side-by-side relationship, the hinge having a generally planar main portion and at least one reinforcing portion extending substantially orthogonal to the planar main portion intermediate a width of the main portion.

10. A dual push-cable according to claim 9 wherein the hinge has a pair of oppositely extending reinforcing portions forming an I-beam.

11. A dual push-cable, comprising:

an elongate resilient flexible push member;

an elongate armored triaxial signal transmitting cable; and an elongate hinge joining the push member and the signal transmitting cable in a substantially parallel side-by-side relationship.

* * * * *